United States Patent [19]

Fausone et al.

[11] 4,241,320
[45] Dec. 23, 1980

[54] CIRCUIT ARRANGEMENT FOR ESTABLISHING WEIGHTING COEFFICIENTS IN AN ANALOG-TYPE ADAPTIVE EQUALIZER

[75] Inventors: Alfredo Fausone; Renato Rivelli, both of Turin, Italy

[73] Assignee: CSELT - Centro Studi e Laboratori Telecomunicazioni S.p.A., Turin, Italy

[21] Appl. No.: 69,130

[22] Filed: Aug. 23, 1979

[30] Foreign Application Priority Data

Aug. 25, 1978 [IT] Italy .................. 68977 A/78

[51] Int. Cl.³ .................................... H04B 3/14
[52] U.S. Cl. ........................ 333/18; 307/264; 330/144; 330/284
[58] Field of Search .............. 333/18, 28 R, 166; 307/264; 330/59, 144–146, 284; 375/14, 15

[56] References Cited

U.S. PATENT DOCUMENTS

| | | | |
|---|---|---|---|
| 3,436,671 | 4/1969 | Fenton et al. | 330/146 X |
| 3,624,562 | 11/1971 | Fujimura | 333/18 |
| 3,735,275 | 5/1973 | Allen et al. | 330/144 X |

*Primary Examiner*—Paul L. Gensler
*Attorney, Agent, or Firm*—Karl F. Ross

[57] ABSTRACT

An adaptive equalizer for a telecommunication system, designed to process high-frequency signals in a band on the order of 50 MHz, comprises several weighting networks with input connections to respective taps of a delay line and with output connections to a summing amplifier, each weighting circuit having a control input to which a selected corrective voltage is applied. Each weighting network includes a bridge with two arms constituted by respective secondaries of an input transformer and two other arms in the form of indirectly variable resistance elements, specifically photoresistors photoelectrically coupled to a pair of light-emitting diodes, capacitively isolated for direct current from other parts of the bridge. Energization of the control input with corrective analog voltage of either polarity unbalances the bridge by differentially exciting the light-conductive diodes through respective operational amplifiers also receiving feedback signals derived from the voltage drops across the associated photoresistors which are traversed by constant currents.

6 Claims, 2 Drawing Figures

CIRCUIT ARRANGEMENT FOR ESTABLISHING WEIGHTING COEFFICIENTS IN AN ANALOG-TYPE ADAPTIVE EQUALIZER

FIELD OF THE INVENTION

Our present invention relates to an adaptive equalizer for a telecommunication system designed to process incoming high-frequency signals to compensate for distortion effects of a transmission channel through which they are received.

BACKGROUND OF THE INVENTION

Equalizers of this type are well known per se and usually include a number of weighting networks to which corrective voltages are applied, the magnitude of these voltages being selected in accordance with the amplitude and phase responses of the channel. In a transversal equalizer, the several weighting networks have input connections to respective taps of a delay line and output connections to a component such as a summing amplifier delivering a combination of all the processed signals, tapped off the delay line, to a load.

Conventional weighting networks, serving to multiply the amplitudes of the variously delayed signals by selected analog coefficients under the control of the corrective voltages applied thereto, include amplifiers of the automatic-gain-control type which, however, require rather complex circuitry especially with signals of large bandwidths. If field-effect transistors are used as the active elements of the networks, serious limitations are imposed upon the maximum amplitudes of the signals to be processed.

One of the problems to be solved in such a transversal equalizer is the undesirable cross-coupling among the several weighting networks resulting from the changes in the effective network impedances, due to the applied corrective voltage, which affect the signals tapped off at other points of the delay line. Another problem is that of effectively measuring the impedance changes induced by the corrective voltage in order to stabilize the weighting coefficient selected for each network.

OBJECTS OF THE INVENTION

The general object of our present invention, therefore, is to provide an improved weighting network for the purpose set forth which solves the aforestated problems.

Another object is to provide means in such a network for effectively stabilizing its weighting coefficient at a selected volume.

SUMMARY OF THE INVENTION

A weighting network embodying our invention, having input means for receiving the high-frequency signals to be processed and output means for emitting the processed signals, comprises a bridge circuit inserted between these input and output means, the bridge circuit including two impedance elements having an electrical resistance which is indirectly variable by an external energy field from an associated energy emitter juxtaposed therewith. Examples of such impedance elements are photoresistors, magnetoresistive devices and indirectly heated thermistors. While any of these may be used in a network according to our invention, the following description will be limited to photoresistors and associated light sources such as light-emitting diodes (LED's). These impedance elements are traversed by a constant reference current so as to generate a voltage drop thereacross which is proportional to their electrical resistance. The associated energy emitters are differentially excited by amplifier means to unbalance the bridge circuit in response to the applied corrective voltage, their excitation being controlled by feedback means connected between the impedance elements and the amplifier means to measure and stabilize the generated voltage drop.

In an advantageous embodiment, the photoresistors are connected to the output means in series with respective impedance arms of the bridge which are coupled with the input means for energization in phase opposition by the incoming high-frequency signals. These impedance arms preferably comprises secondary windings of a transformer (or possibly of two transformers) whose primary winding is connected to the tap of the delay line feeding in the incoming signals.

With the photoresistors capacitively separated from other parts of the bridge circuit, the direct current used for measuring their resistance cannot reach either the input or the output of the network. Moreover, since the resistances of the two photoelectrically controlled bridge arms vary in opposite senses, the bridge impedance as seen from the delay line is not significantly altered by the corrective voltage applied to the network. The use of the voltage drop across these variable resistances as a feedback parameter for stabilization purposes establishes a high degree of linearity bewteen the corrective voltage and the weighting coefficient introduced by the network, with effective compensation for possible thermal drifts of these indirectly controlled resistances. We have found that such a network may process signals of widely varying amplitudes over a frequency band on the order of 50 MHz. The circuit components employed are readily available on the market and relatively inexpensive.

BRIEF DESCRIPTION OF THE DRAWING

The above and other features of our invention will now be described in detail with reference to the accompanying drawing in which.

SPECIFIC DESCRIPTION

Figure 1:
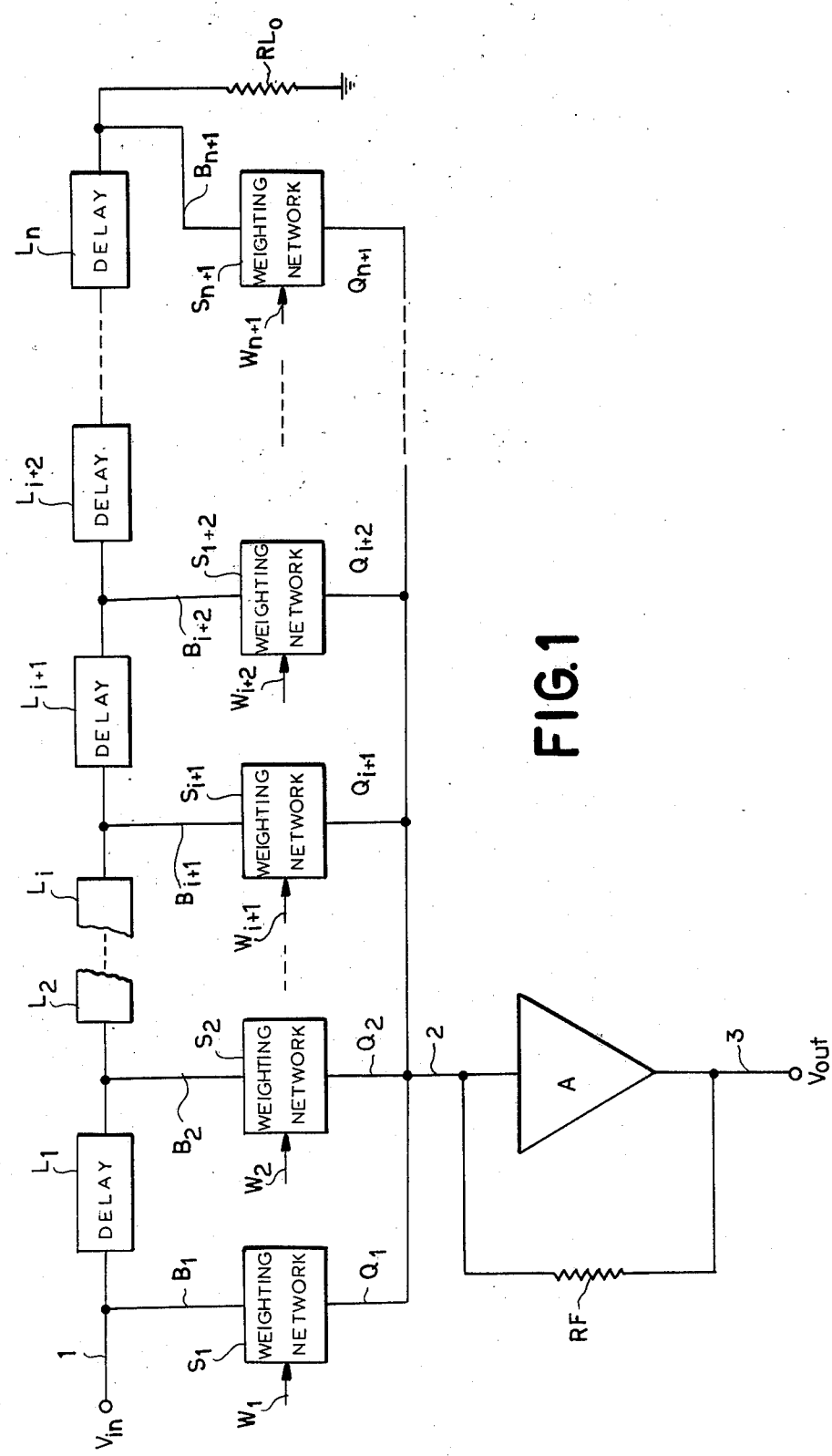
FIG. 1 is a block diagram of a transversal adaptive equalizer embodying our invention.

In FIG. 1 we have shown a delay line 1 receiving incoming signal voltages $V_{in}$ from a nonillustrated communication channel, the line 1 being divided into a multiplicity of sections $L_1, L_2, \ldots L_i, L_{i+1}, L_{i+2}, \ldots L_n$. At its opposite end, the line is terminated by a dummy load $RL_o$ matching its own characteristic impedance. A number of weighting networks $S_1, S_2, \ldots S_{i+1}, S_{i+2}, \ldots S_{n+1}$ have inputs $B_1, B_2, \ldots B_{i+1}, B_{i+2}, \ldots B_{n+1}$ connected to line 1 by taps separated from one another by the delay sections $L_1-L_n$. The individual network outputs $Q_1, Q_2, \ldots Q_{i+1}, Q_{i+2}, \ldots Q_{n+1}$ are jointly connected to an inverting input of a summing amplifier A of the operational type provided with a feedback resistor RF. Amplifier A has a low input impedance facilitating the proper additive superposition of the output signals from the several weighting networks. Each weighting network further has a control terminal $W_1, W_2, \ldots W_{i+1}, W_{i+2}, \ldots W_{n+1}$ to which individual corrective voltages, determined in the usual manner from the transmission characteristics of the associated communication channel, are applied. Summing amplifier A has an output 3 carrying the combined signal voltages $V_{out}$.

Figure 2:
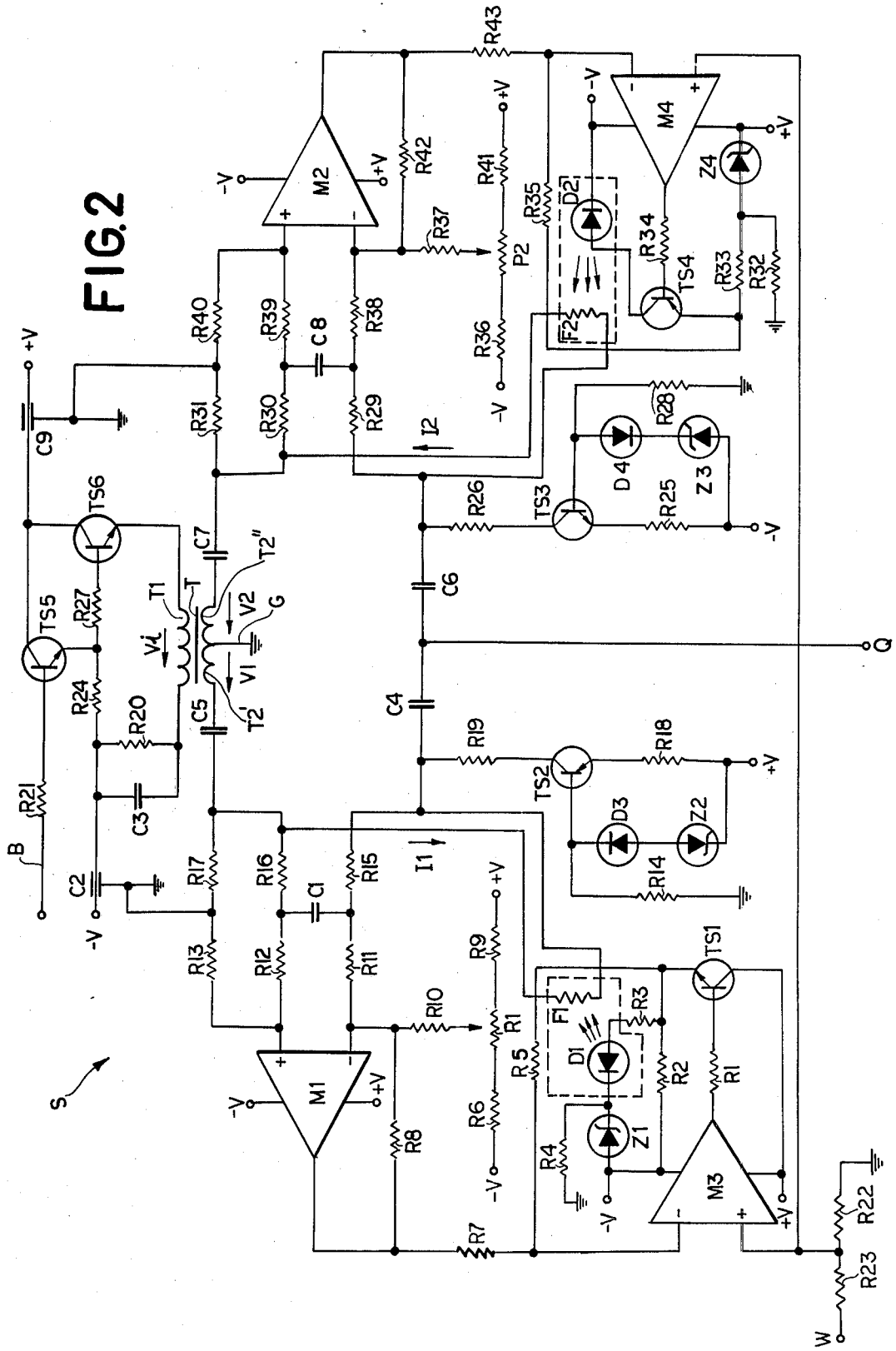
FIG. 2 is a detailed circuit diagram of a weighting network forming part of the equalizer of FIG. 1.

FIG. 2 shows a weighting network S representative of any of the networks $S_1-S_{n+1}$ illustrated in FIG. 1. Input B of the network is connected via a resistor R21 to the base of an NPN transistor TS5 having its collector energized from a positive supply terminal +V, which interposition of a feedthrough capacitor C9 serving to shunt high-frequency transients to ground. A similar feedthrough capacitor C2 lies between a negative supply terminal −V and the base of another NPN transistor TS6 in series with two resistors R24, R27 whose junction is connected to the emitter of transistor TS5. Transistor TS6 has its collector also connected via capacitor C9 to supply terminal +V, its emitter being connected to terminal −V by way of capacitor C2 in series with a resistor R20 and the primary T1 of a transformer T. Resistor R20 is shunted by a preferably electrolytic capacitor C3. The incoming signals traversing the transformer primary have been designated Vi.

Transformer T has two secondaries T2', T2" each having the same number of turns as the primary T1 so as to carry respective signal voltages V1 and V2 which are of the same magnitude as voltage Vi but in phase opposition with reference to a common ground terminal constituting one of the corners of an impedance bridge whose opposite corner is connected to the network output Q. These transformer secondaries form two of the arms of the bridge, on opposite sides of its output diagonal, whose other two arms comprise a pair of photoresistors F1 and F2 which are separated from windings T2', T2" and from terminal Q by four blocking capacitors C4–C7.

Two constant-current generators are represented by a PNP transistor TS2 and an NPN transistor TS3 whose bases are grounded via respective resistors R14, R28 and are further connected to supply terminals +V and −V by way of a Zener diode Z2 in series with a rectifying diode D3 and a Zener diode Z3 in series with a rectifying diode D4, respectively. Constant current flows from terminal +V through a resistor R18 to the emitter of a transistor TS2 and from its collector through a resistor R19, photoresistor F1 and a further resistor R17 to ground. In an analogous manner, constant current passes from ground through a resistor R31, photoresistor F2 and a further resistor R26 to the collector of transistor TS3 and from its emitter through another resistor R25 to terminal −V.

An operational feedback amplifier M1 has its inverting and noninverting inputs connected across photoresistor F1 through a low-pass filter comprising two pairs of series resistors R11, R15 and R12, R16 with junctions bridged by a shunt capacitor C1. The resistor pair R12, R16 is shunted by the aforementioned resistor R17 in series with a further resistor R13. Similarly, an operational feedback amplifier M2 has its inverting and noninverting inputs connected across photoresistor F2 through a low-pass filter comprising two pairs of series resistors R29, R38 and R30, R39 with junctions bridged by a shunt capacitor C8; resistor pair R30, R39 is shunted by the aforementioned resistor R31 in series with a further resistor R40.

Control terminal W is connected by way of a voltage divider, consisting of resistors R22, R23, to the noninverting inputs of two operational driving amplifiers M3 and M4 whose inverting inputs are connected to the outputs of feedback amplifiers M1 and M2 via respective resistors R7 and R43. Amplifier M3 has an output connected through a resistor R1 to the base of an NPN control transistor TS1 whose collector is tied to terminal +V and whose emitter is connected to terminal −V via a resistor R2 and is further connected to ground by way of a light-emitting diode D1 in series with two resistors R3 and R4. Diode D1, which is closely juxtaposed with photoresistor F1 for illuminating same, has its cathode connected to terminal −V by way of a Zener diode Z1. Analogously, amplifier M4 has an output connected through a resistor R34 to the base of a PNP control transistor TS4 whose emitter is grounded through a pair of series resistors R32, R33 and whose collector is connected to terminal −V through a light-emitting diode D2 closely juxtaposed with photoresistor F2 for illuminating the same. The junctions of resistors R32 and R33, which are in series with diode D2, are connected to terminal +V via a Zener diode Z4. The emitters of control transistors TS1 and TS4 are connected to the inverting terminals of the associated driving amplifiers M3 and M4 by way of respective resistors R5 and R35.

An adjustable bias is applied to the inverting terminal of each feedback amplifier M1 and M2 by a respective potentiometer P1 and P2. Potentiometer P1 lies between supply terminals +V and −V in series with two resistors R6, R9 and hss its slider connected to the inverting input of amplifier M1 via a resistor R10, that input being further connected to the output of amplifier M1 through a feedback resistor R8. Potentiometer P2 is connected between the same supply terminals in series with two resistors R36, R41 and has its slider connected by way of a resistor R37 to the inverting input of amplifier M2 which is also connected to its output via a feedback resistor R42.

As will be apparent from the drawing, the reference current passing through PNP transistor TS2 generates a voltage drop across photoresistor F1 which is of such polarity that feedback amplifier M1 delivers a negative output voltage to the inverting input of driving amplifier M3. The latter amplifier, therefore, has a positive output maintaining the NPN control transistor TS1 in a state of conduction which keeps the diode D1 in its light-emitting state.

Conversely, the voltage drop generated across photoresistor F2 by the reference current from NPN transistor TS3 results in a positive output voltage from feedback amplifier M2 which, on being applied to the inverting input of driving amplifier M4, produces a negative output maintaining the PNP control transistor TS4 conductive whereby diode D2 is also kept in its light-emissive state. When the corrective voltage applied to control terminal W is zero, i.e. when that terminal is at ground potential, the operating points of transistors TS1 and TS4 are so chosen—through suitable adjustment of the associated potentiometers P1 and P2—that photoresistors F1 and F2 have the same magnitude, e.g. 600Ω. With elements F1 and F2 traversed by constant reference currents equal to 1 mA, for example, each photoresistor then develops a d-c voltage drop of 600 mV. The equality of the electrical resistances of elements F1 and F2 results in equal and opposite output currents I1 and I2 due to signal voltages V1 and V2 across the bridge diagonal Q, G so that the net contribution of this network S to the input of summing amplifier A (FIG. 1) is zero.

With a positive corrective voltage applied to terminal W, the conduction of transistor TS1 increases while that of transistor TS4 decreases. Thus, the illumination of photoresistor F1 is intensified whereas that of photoresistor F2 is reduced. The resulting lowering of the electrical resistance of element F1 diminishes the voltage drop thereacross and reduces the feedback voltage delivered to the inverting input of amplifier M3, thereby counteracting the voltage increase on its noninverting input. By the same token, the augmented electrical resistance of element F2 results in a larger voltage drop which increases the feedback voltage delivered to the inverting input of amplifier M4. This negative-feedback effect stabilizes the bridge resistances at their new values determined by the selected corrective voltage. With the bridge thus unbalanced, the current I1 exceeds the relatively inverted current I2 so as to result in an output current cophasal with signal Vi at the input of summing amplifier A (FIG. 1).

The application of a negative corrective voltage to control terminal W has, of course, the opposite result and causes the appearance of an output current 180° out of phase with signal Vi at the input of summing amplifier A.

If, with a given corrective voltage present on terminal W, the resistance of either element F1, F2 changes as a result of thermal drift, for example, a compensatory variation in the excitation of the associated LED will promptly re-establish the proper resistance value as determined by that voltage. Let us assume, for instance, that the resistance of photoresistor F1 rises for a reason other than a change in the energization of terminal W. The higher voltage drop transmitted to amplifier M1 then raises the absolute value of the feedback voltage of negative polarity transmitted to driving amplifier M3 so that control transistor TS1 becomes more conductive and increases the light emission from diode D1. This, in turn, lowers the resistivity of the associated photoresistor F1.

If the blocking capacitors C4–C7 of the bridge circuit have sufficiently large capacitances, their impedance for the high-frequency signal currents will be negligible. The output currents traversing the two branches of the bridge are then given by $$I1 \approx \frac{V1}{F1} \quad (1a)$$

$$I2 \approx \frac{V2}{F2} \quad (1b)$$

The voltage $T_{out}$ at the output 3 of amplifier A (FIG. 1) is then given, according to the well-known theorem of operational amplifiers, by $$V_{out} = |I1 - I2|RF = \left|\frac{V1}{F1} - \frac{V2}{F2}\right|RF = \left|\frac{Vi}{F1} - \frac{Vi}{F2}\right|RF = Vi\left|\frac{F2-F1}{F1 \cdot F2}\right|RF \quad (2)$$

The weighting coefficient $K = V_{out}/V_{in}$ is thus given by $$K = \frac{F2-F1}{F1 \cdot F2} RF \quad (3)$$

It will be apparent that the described weighting network would operate in essentially the same manner if photoresistors F1, F2 and LED's D1, D2 were replaced by magnetoresistances and electromagnetic coils or by thermistors and associated heating elements.

We claim:

1. A weighting network for an adaptive equalizer inserted between a transmission channel and a load for processing incoming high-frequency signals by multiplying their amplitudes by selected analog coefficients, comprising:

input means for receiving the high-frequency signals to be processed;

output means for emitting the processed high-frequency signals;

a control terminal for receiving a corrective voltage determining a selected analog coefficient;

a bridge circuit inserted between said input and output means, said bridge circuit including two impedance elements having an electrical resistance indirectly variable by an external energy field;

a source of constant reference current connected to each of said impedance elements for generating a voltage drop, proportional to said resistance, thereacross;

a pair of energy emitters respectively juxtaposed with said impedance elements;

amplifier means connected to said terminal and across said energy emitters for differentially exciting same to unbalance said bridge circuit in response to said corrective voltage; and feedback means connected between said impedance elements and said amplifier means for stabilizing the excitation of said energy emitters in response to the voltage drop across the respective impedance elements.

2. A weighting network as defined in claim 1 wherein said bridge circuit further includes two impedance arms coupled with said input means for energization in phase opposition by said incoming high-frequency signals, each of said impedance elements being connected to said output means in series with one of said impedance arms.

3. A weighting network as defined in claim 2 wherein said impedance arms are transformer secondaries.

4. A weighting network as defined in claim 2 or 3 wherein said bridge circuit further includes a plurality of blocking capacitors separating said impedance elements from said impedance arms and from said output means.

5. A weighting network as defined in claim 1, 2 or 3 wherein said impedance elements are photoelectrically coupled with said energy emitters.

6. A weighting network as defined in claim 1, 2 or 3 wherein said feedback means comprises a pair of first operational amplifiers each having an inverting and noninverting input connected across one of said impedance elements, said amplifier means comprising a pair of second operational amplifiers each having an inverting input connected to an output of one of said first operational amplifiers and a noninverting input connected to said terminal.

* * * * *